(12) United States Patent
Starkey

(10) Patent No.: US 8,013,234 B1
(45) Date of Patent: Sep. 6, 2011

(54) REFLECTIVE PIANO KEYBOARD SCANNER

(75) Inventor: David T. Starkey, La Jolla, CA (US)

(73) Assignee: Midi9 LLC, La Jolla, CA (US)

( * ) Notice: Subject to any disclaimer, the term of this patent is extended or adjusted under 35 U.S.C. 154(b) by 0 days.

(21) Appl. No.: 12/889,403

(22) Filed: Sep. 23, 2010

Related U.S. Application Data

(62) Division of application No. 11/969,628, filed on Jan. 4, 2008, now Pat. No. 7,843,575.

(60) Provisional application No. 60/884,995, filed on Jan. 15, 2007.

(51) Int. Cl.
  *G10H 1/00* (2006.01)

(52) U.S. Cl. .......................................... 84/724; 700/108

(58) Field of Classification Search .................... 84/724; 700/108
  See application file for complete search history.

(56) References Cited

U.S. PATENT DOCUMENTS

| | | | | |
|---|---|---|---|---|
| 3,223,769 A | * | 12/1965 | Wroblewski | 84/724 |
| 3,513,247 A | * | 5/1970 | Anderson et al. | 84/724 |
| 3,621,268 A | * | 11/1971 | Friedrich et al. | 250/214.1 |
| 3,769,515 A | * | 10/1973 | Clark, Jr. | 250/341.7 |
| 4,028,977 A | * | 6/1977 | Ryeczek | 84/724 |
| 4,092,640 A | * | 5/1978 | Satoh | 341/34 |
| 4,351,221 A | * | 9/1982 | Starnes et al. | 84/609 |
| 4,362,934 A | * | 12/1982 | McLey | 250/229 |
| 4,429,607 A | * | 2/1984 | Meno | 84/679 |
| 4,468,999 A | * | 9/1984 | Bonanno | 84/687 |
| 4,475,427 A | * | 10/1984 | Starkey | 84/671 |
| 4,628,786 A | * | 12/1986 | Buchla | 84/689 |
| 4,686,880 A | * | 8/1987 | Salani et al. | 84/644 |
| 4,688,460 A | * | 8/1987 | McCoy | 84/724 |
| 4,736,662 A | * | 4/1988 | Yamamoto | 84/724 |
| 4,768,412 A | * | 9/1988 | Sanderson | 84/645 |
| 4,790,230 A | * | 12/1988 | Sanderson | 84/462 |
| 4,815,353 A | * | 3/1989 | Christian | 84/724 |
| 4,953,437 A | * | 9/1990 | Starkey | 84/603 |
| 4,969,385 A | * | 11/1990 | Williams et al. | 84/656 |
| 4,974,482 A | * | 12/1990 | Tamaki et al. | 84/653 |
| 5,001,339 A | * | 3/1991 | Starkey et al. | 250/229 |
| 5,034,602 A | * | 7/1991 | Garcia et al. | 250/227.22 |
| 5,107,748 A | * | 4/1992 | Muramatsu et al. | 84/658 |
| 5,164,532 A | * | 11/1992 | Ishii et al. | 84/639 |
| 5,194,685 A | * | 3/1993 | Kawamura et al. | 84/670 |
| 5,196,639 A | * | 3/1993 | Lee et al. | 84/603 |
| 5,200,562 A | * | 4/1993 | Kaneko et al. | 84/21 |
| 5,214,232 A | * | 5/1993 | Iijima et al. | 84/724 |
| 5,231,283 A | * | 7/1993 | Starkey et al. | 250/229 |
| 5,237,123 A | * | 8/1993 | Miller | 84/21 |

(Continued)

*Primary Examiner* — David S. Warren
(74) *Attorney, Agent, or Firm* — File-EE-Patents.com; Jay A. Chesavage

(57) ABSTRACT

A scanner for a keyboard device having a reflective surface for each key has a sensor associated with each key that includes an LED and a photo-transistor. The LED is turned ON for a first measurement, followed by a second measurement with the LED turned off, and a subtraction of the second measurement from the first yields an illumination value for a key x. The LEDs and associated photo-transistors are sequentially enabled in groups of n, thereby eliminating optical interference. Each key x has associated correction parameters of LinRest(x) associated with illumination value with the key in the rest (up) position, LinDown(x) associated with illumination value with the key in the down position, TrebErr(x) associated with the reflectivity effect of one adjacent key(x+1), and BassErr(x) associated with the reflectivity effect of another adjacent key(x−1). By reading a single illumination value in combination with these correction parameters, the key position may be accurately extracted and the effect of ambient light and surrounding key interference removed.

20 Claims, 8 Drawing Sheets

U.S. PATENT DOCUMENTS

| | | | | |
|---|---|---|---|---|
| 5,451,708 A * | 9/1995 | Fujiwara et al. | | 84/21 |
| 5,505,115 A * | 4/1996 | Vandervoort | | 84/423 R |
| 5,524,521 A * | 6/1996 | Clift et al. | | 84/462 |
| 5,567,902 A * | 10/1996 | Kimble et al. | | 84/658 |
| 5,571,982 A * | 11/1996 | Masubuchi | | 84/658 |
| 5,763,799 A * | 6/1998 | Kimble | | 84/433 |
| 5,824,930 A * | 10/1998 | Ura et al. | | 84/462 |
| 5,834,669 A * | 11/1998 | Clift et al. | | 84/462 |
| 5,841,050 A * | 11/1998 | Clift et al. | | 84/462 |
| 5,990,409 A * | 11/1999 | Takahashi et al. | | 84/724 |
| 5,998,727 A * | 12/1999 | Toba et al. | | 84/724 |
| 6,008,783 A * | 12/1999 | Kitagawa et al. | | 345/39 |
| 6,037,534 A * | 3/2000 | Yasutoshi et al. | | 84/477 R |
| 6,153,822 A * | 11/2000 | Toba et al. | | 84/724 |
| 6,175,074 B1 * | 1/2001 | Takahashi et al. | | 84/724 |
| 6,229,081 B1 * | 5/2001 | Ura et al. | | 84/462 |
| 6,297,437 B1 * | 10/2001 | Ura et al. | | 84/423 R |
| 6,384,305 B1 * | 5/2002 | Lee | | 84/21 |
| 6,472,589 B1 * | 10/2002 | Lee | | 84/21 |
| 6,501,012 B1 * | 12/2002 | Toba et al. | | 84/724 |
| 6,777,604 B1 * | 8/2004 | Sanderson | | 84/423 R |
| 7,060,883 B2 * | 6/2006 | Nagaoka et al. | | 84/423 R |
| 7,151,212 B2 * | 12/2006 | Nagaoka et al. | | 84/423 R |
| 7,161,137 B2 * | 1/2007 | Ura et al. | | 250/222.1 |
| 7,217,880 B2 * | 5/2007 | Sant | | 84/645 |
| 7,227,069 B1 * | 6/2007 | Sanderson | | 84/423 R |
| 7,265,337 B2 * | 9/2007 | Doe | | 250/231.13 |
| 7,339,105 B2 * | 3/2008 | Eitaki | | 84/615 |
| 7,598,449 B2 * | 10/2009 | Sullivan | | 84/646 |
| 7,812,244 B2 * | 10/2010 | Kotton et al. | | 84/724 |
| 7,843,575 B1 * | 11/2010 | Starkey | | 356/614 |
| 7,897,866 B2 * | 3/2011 | Sullivan | | 84/724 |
| 7,902,448 B2 * | 3/2011 | Kikumoto et al. | | 84/615 |
| 2002/0003708 A1 * | 1/2002 | Roller et al. | | 362/521 |
| 2004/0003708 A1 * | 1/2004 | Buchla | | 84/724 |
| 2005/0077453 A1 * | 4/2005 | Kato | | 250/221 |
| 2006/0236850 A1 * | 10/2006 | Shaffer | | 84/724 |
| 2007/0017341 A1 * | 1/2007 | Nishida | | 84/423 R |
| 2007/0017356 A1 * | 1/2007 | Nishida | | 84/744 |
| 2008/0011151 A1 * | 1/2008 | Kato | | 84/724 |
| 2010/0011942 A1 * | 1/2010 | Wessels | | 84/724 |
| 2010/0154620 A1 * | 6/2010 | Loock et al. | | 84/724 |
| 2011/0061517 A1 * | 3/2011 | Haddad | | 84/724 |

* cited by examiner

Keyboard Scanner

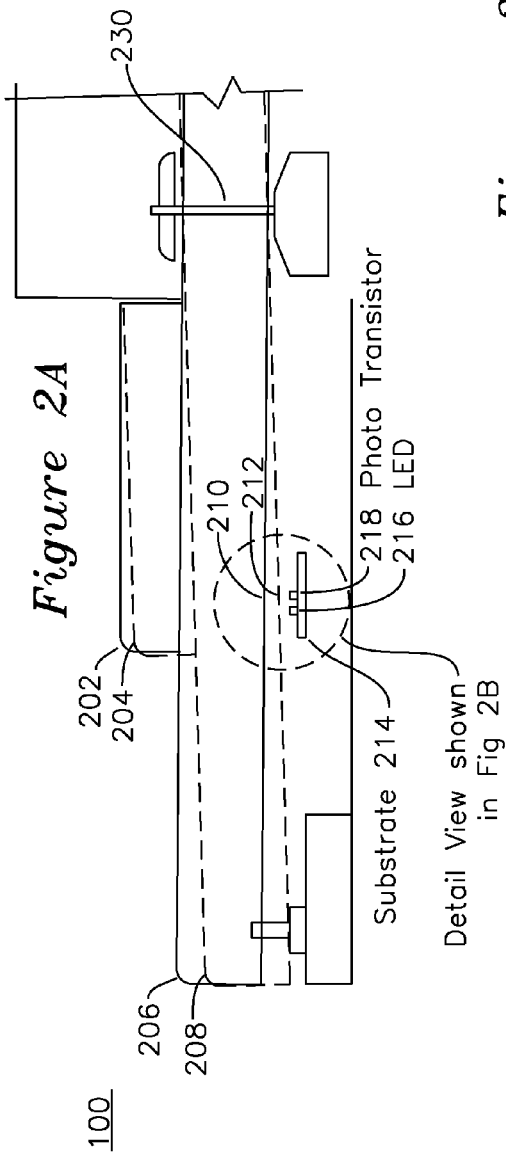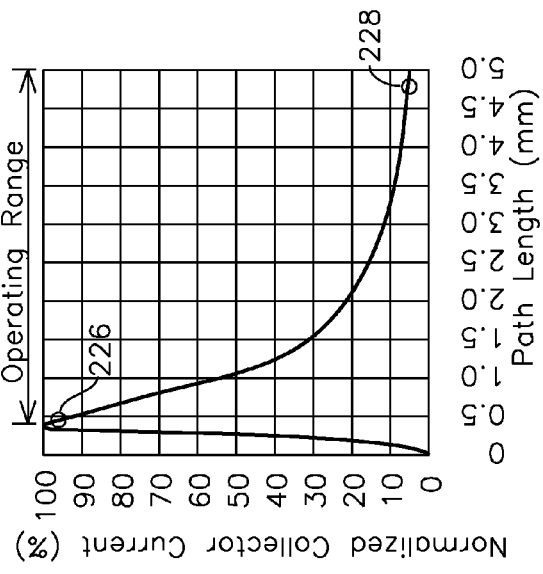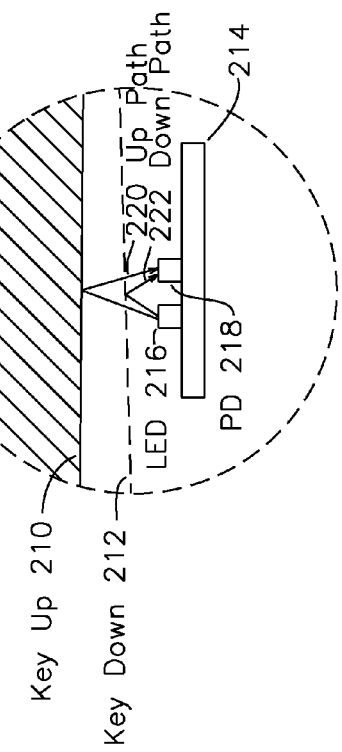

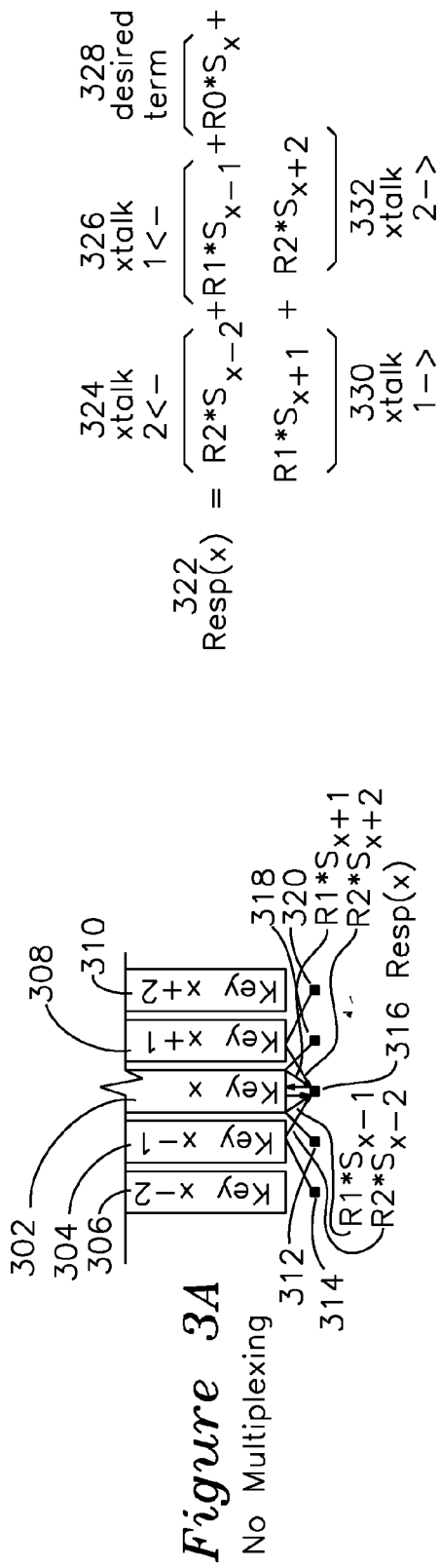
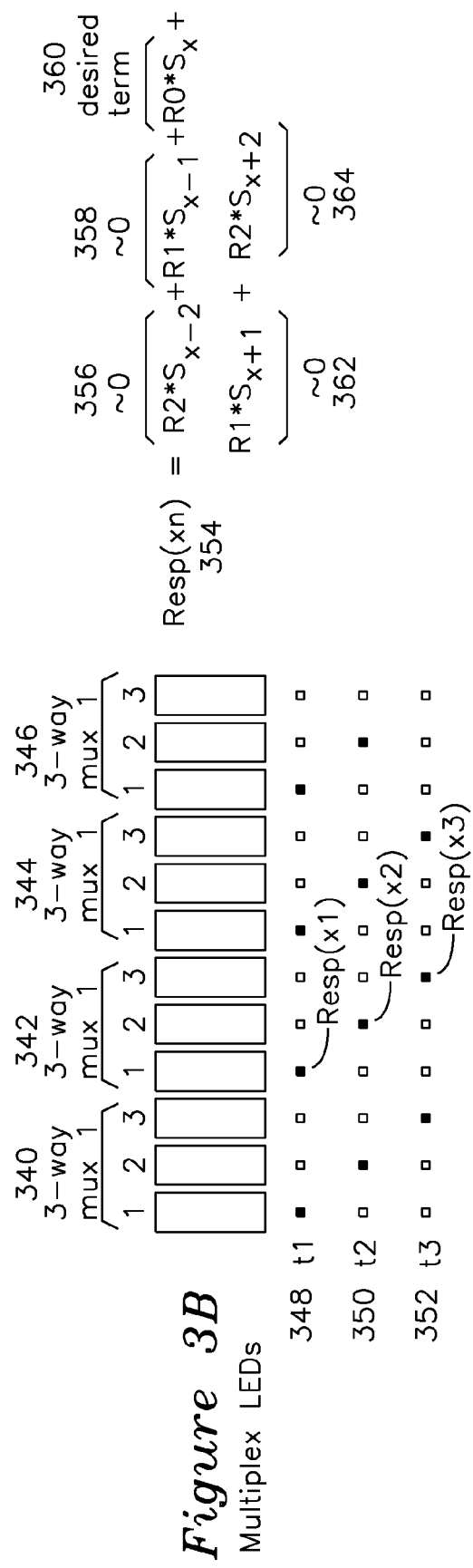
Figure 3A
No Multiplexing
Figure 3B
Multiplex LEDs

Multiplex LEDs+
Photo-transistors

Resp(1) + Resp(2) + Resp(3) = R1S$_x$ + R0S$_x$ + R1S$_x$
(shown for x=2)

Crosstalk

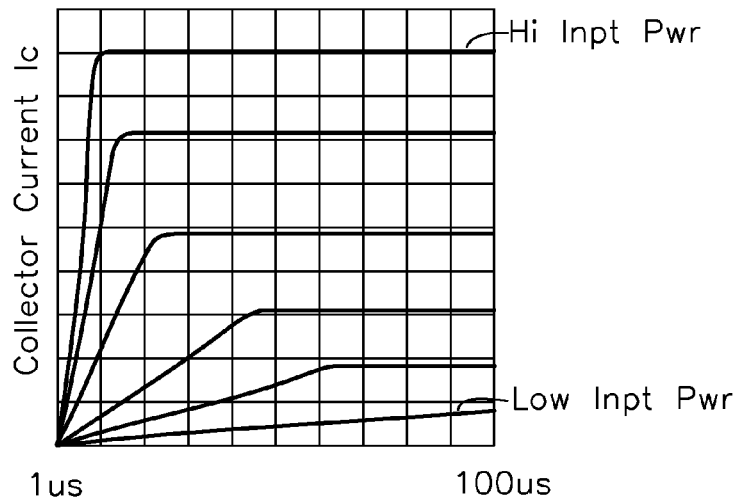
*Figure 4A*
Turn-on
Characteristic
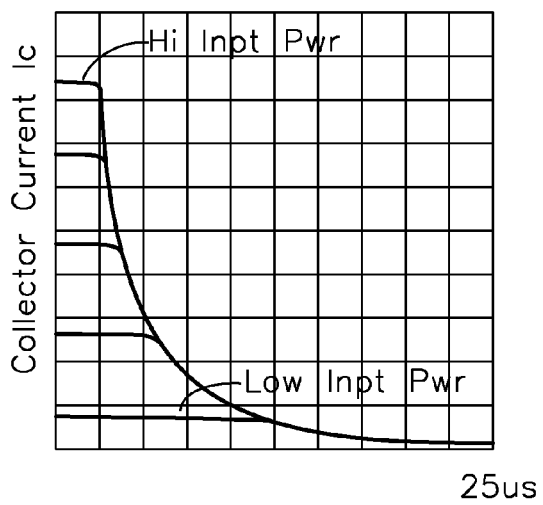
*Figure 4B*
Turn-off
Characteristic
*Figure 4C*
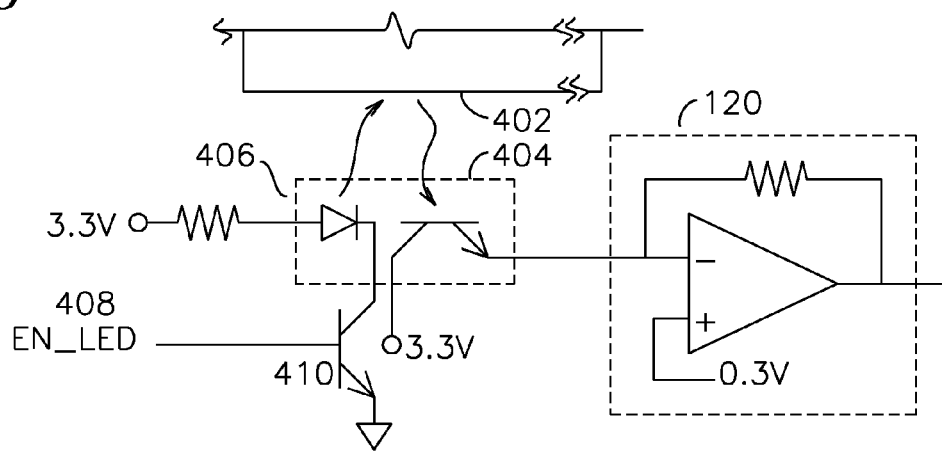

Single Key Process

REFLECTIVE PIANO KEYBOARD SCANNER

FIELD OF THE INVENTION

This is a divisional application of patent application Ser. No. 11/969,628 filed on Jan. 4, 2008 now U.S. Pat. No. 7,843,575, which claims priority of provisional patent application Ser. No. 60/884,995 filed Jan. 15, 2007, the entirety of which is incorporated herein by reference. The present invention relates to measurement of key movement on a piano keyboard. In particular, the invention relates to the detection of displacement and velocity of a moving key.

BACKGROUND OF THE INVENTION

Through the years, many systems have been devised to provide a musical note level or MIDI language recording of a player's performance of a piano or other keyboard musical instrument. These devices have been used to provide realtime accompaniment or sound reinforcement for the performer. Some of these devices are complex or bulky, and require an intricate, invasive installation, for example those mounted external to the piano case, such as U.S. Pat. No. 4,768,412 and Pub 2002/0003708. There are many known ways of detecting a displacement and a displacement speed, or other note expression data of a keyboard for a musical instrument. The earliest known methods were mechanical switch structures. However, these had significant disadvantages, such as uniformity of response. Additionally, these types of switches affected key touch while playing, required time-consuming mounting, needed very tight vertical and horizontal adjustment, and generally had a high cost. For a further discussion of the problems of electro-mechanical switches see U.S. Pat. No. 4,628,786 issued to Buchla. The apparatus, according to Buchla, overcomes some of the problems and disadvantages of these prior art mechanical switch structures by providing a pickup sensor for each key that is moved within an electric field formed between a pair of stationary electrodes. Although still a mechanical system, since the pickup never contacts either of the electrodes, Buchla avoids many of the problems inherent in previous mechanical contact switches. A major advantage of the Buchla apparatus is that the voltage impressed on the electric field pickup sensor varies as a function of the position of the pickup within the electric field (i.e. voltage varies according to amount of key depression). The Buchla invention is thus a continuous position sensor providing the capability to capture greater note expression data, and provide for better velocity resolution. However, this apparatus is complex, costly, and requires time consuming installation and calibration. Additionally, the circuitry required to impress the AC voltages of equal amplitude but opposite phase on the two electrodes and the detection circuitry are complex and costly.

In response to the above inherent limitations of mechanical switch structures, various attempts have utilized types of opto-electronic switches. One of the first was U.S. Pat. No. 4,351,221 issued to Starnes, et al. This system however requires two optical LED sensors per key and utilizes the sensors in a manner that creates a double contact system, thus eliminating the advantages of continuous linear position sensor. Additionally, this apparatus requires elaborate and delicate installation of photo sensors by permanent attachment to the underside of the piano keys.

Another opto-electronic switch mechanism utilizing a stationary opto-isolator in conjunction with a light path paddle mounted on a moving key is known from U.S. Pat. No. 4,362,934 issued to McLey. However, this apparatus has the same limitations as the system issued to Starnes, et al discussed above and further, is more commonly limited to electronic keyboards.

Another optical sensing means is known from U.S. Pat. No. 4,736,662 issued to Yamamoto. In order to reduce the number of displacement speed electrical signal converting elements and provide a design for use in a limited space, this apparatus utilizes stationary optical sensor elements which are coupled to optical detector using optical fibers, and the optical sensors are positioned adjacent to moving key paddles of the key striker mechanism, where the moving paddles obstruct the optical path. Another invention is known from U.S. Pat. No. 4,768,412 issued to Sanderson. This system uses a single optical sensor per key comprising an optical transmission sensor whose light path is interrupted by a paddle connected to the keys, where an adapter plate rests on top of the keyboard to translate key motion to the sensors. U.S. Pat. App. 2004/0003708 by Buschla describes a similar system with sensors placed over the tops of the keyboard, where a reflectivity measurement is made from the surfaces of the white keys and the black keys act as photo path interrupters. Velocity measurement is made by using vertically displaced black key sensors and measuring the time interval from first to second sensor path opening as the key is depressed. The white keys and black keys photodiodes are read by an A/D converter. One drawback of this system is that the basis of measurement is completely different between white keys (declining reflectivity) and black keys (key movement time from first to second sensor).

The use of optical interrupters with paddles mounted under a keyboard to measure continuous key position is also described in U.S. Pat. Nos. 5,824,930 and 6,229,081, and 6,297,437 by Ura et al.

Another invention is known from U.S. Pat. No. 5,567,902 by Kimble et al. This device uses non-multiplexed optical encoders mounted underneath keys to determine key position, but does not address crosstalk between keys or ambient light correction, and the problem of non-linearity of reflectivity response is handled by limiting the usable range of the sensor of a 25% section that is linear with position. As all of the LEDs within an octave are simultaneously enabled, optical pollution from illumination of an adjacent key into the sensor for the key to be measured must be handled using baffles and the like. Additionally, mechanical responses from adjacent keys to the key to be measured are not considered.

Another keyboard sensor is described in U.S. Pat. No. 5,231,283 by Starkey and Williams, which utilizes an under key paddle which pivots on a hinge below the keyboard, thereby moving the paddle across an optical detector which measure the degree of path interruption. The paddle is shaped to provide a linear response with key movement, and a hinge and spring mechanism removes the requirement to attach the paddles directly to the keys, as described earlier for U.S. Patent Nos. 4,362,934 and 4,351,221. U.S. Pat. No. 5,231,283 also describes a method to convert position and time data into accurate MIDI information.

U.S. Pat. No. 5,524,521 by Clift et al describes a sensor system for use on the hammers of a piano, where a sensor for the hammer measures surface reflectivity of the hammer, thereby extracting a velocity and duration measurement.

OBJECTS OF THE INVENTION

One object of the invention is to provide a position transducer and compensation system that can provide highly accurate data in both the time and position domains.

Another object of the invention to be minimize the physical size of the sensor, preferably arranging the sensors on a linear strip or strips, so it can fit inside a new or existing acoustic piano, electronic organ, or any keyboard device requiring accurate measurement of individual key positions.

Another object of the invention is the measurement of key position using reflected light from a sensor having an optical source and optical detector which measures light reflecting from a surface of the key to be measured. A non-contact mounting method eliminates any interference with keyboard motion.

Another object of the invention is the provision of continuous stream of samples of key position information to provide closed loop operation for player piano systems.

Another object of the invention is the reduction of key position estimation errors caused by either ambient light or reflection crosstalk from adjacent keys when estimating key position by measuring the optical power reflected from a particular key.

Another object of the invention is the elimination of key position errors from the motion of adjacent keys. Another object of the invention is to provide reflectivity measurements for use in estimating key position that are impervious to the variations of black and white keys.

Another object of the invention is to provide positional measurement of sufficient accuracy and frequency so as to provide accurate key velocity information.

Another object of the invention is a reflectivity-based measurement of key position which allows for the sensors to be placed in a visually inconspicuous region with respect to a performer and audience, and functionally unobtrusive location with respect to the piano key and hammer mechanisms.

SUMMARY OF THE INVENTION

The present invention provides methods and devices for providing data from the performance of a musical instrument. The instrument can be any musical instrument having a keyboard, such as a piano, organ or accordion, including their electronic versions. The invention can be applied to keys, pedals, or buttons or switches that provide position or velocity information. The invention can also be applied to any device having keys where accurate information of the position of individual keys is important, such as a video game controller.

More specifically, the invention provides an accurate measurement of the position of a key of an instrument, which can be further used with time data to provide velocity or acceleration information. This information provided can then be converted to any standard format for musical information, such as a MIDI format. The process of generating MIDI velocity data is well described in U.S. Pat. No 5,231,283 by Starkey et al. Then this data can be transmitted to one or more musical instruments or storage devices for real time performance. In addition, the invention can generate positional data that can be further interpreted for more complex music synthesis, reproduction or performance archival purposes.

The present invention measures (samples) the position of the keys at discrete time points. The position is measured using a reflective scanning system, such as one positioned under the front portion of the piano key. The device can be mounted in several different positions and configurations behind the fulcrum: above the key looking down, behind the key looking at the back of the key.

In the reflective scanning system, a light source (such as an LED transmitter) provides light, which is reflected off the surface of a key. The reflected light is detected and measured by a device such as a photo-transistor. The measurement of light can involve the relative amplitude of light or changes in angle of reflected light. Improved position information is provided by one or any combination of the following elements, which can be performed in any order:

A. Reduction of cross-talk (interference from light reflected from other keys or from light sources directed to other keys)

B. Reduction of interference due to (varying levels of) ambient light

C. Providing position and velocity information by a linearization algorithm

In one embodiment, the invention provides a no-contact, inexpensive and unobtrusive opto-electronic sensor for acoustic pianos. The invention uses low cost components, so there is no need for focused light beams or any attachments to piano keys. The invention further uses independent microprocessor systems using a synchronization system. It requires no mechanical adjustments after installation under the keys of the piano keyboard. After installation the device learns the environment inside the piano and uses several novel techniques to compensate for parasitic effects found under the piano keys. These techniques allow for large latitude in installation ensuring that no further mechanical adjustments will be required. Immediately following installation the system learns its environment including individual key travel and cross talk between adjacent keys. During operation it samples (measures) the position of each key nearly 1000 times per second, compensating for ambient light, adjacent key crosstalk and the nonlinearity of the position curve. Thus, the invention allows the system to produce uncompromised MIDI velocity accuracy at a low cost.

BRIEF DESCRIPTION OF THE DRAWINGS

FIG. 2A shows a side view of a piano key.

FIG. 2B shows a detail view of FIG. 2A.

FIG. 2C shows a response curve for a possible sensor for FIG. 2A.

FIG. 3A shows a cross section of keys with no sensor multiplexing.

FIG. 3B shows a cross section of keys with LED multiplexing.

FIG. 4A shows the turn-on characteristic for a photo-detector.

FIG. 4B shows the turn-off characteristic for a photo-detector.

FIG. 4C shows a schematic diagram of a sensor with relation to a piano key.

DESCRIPTION OF THE EMBODIMENTS

Figure 1:
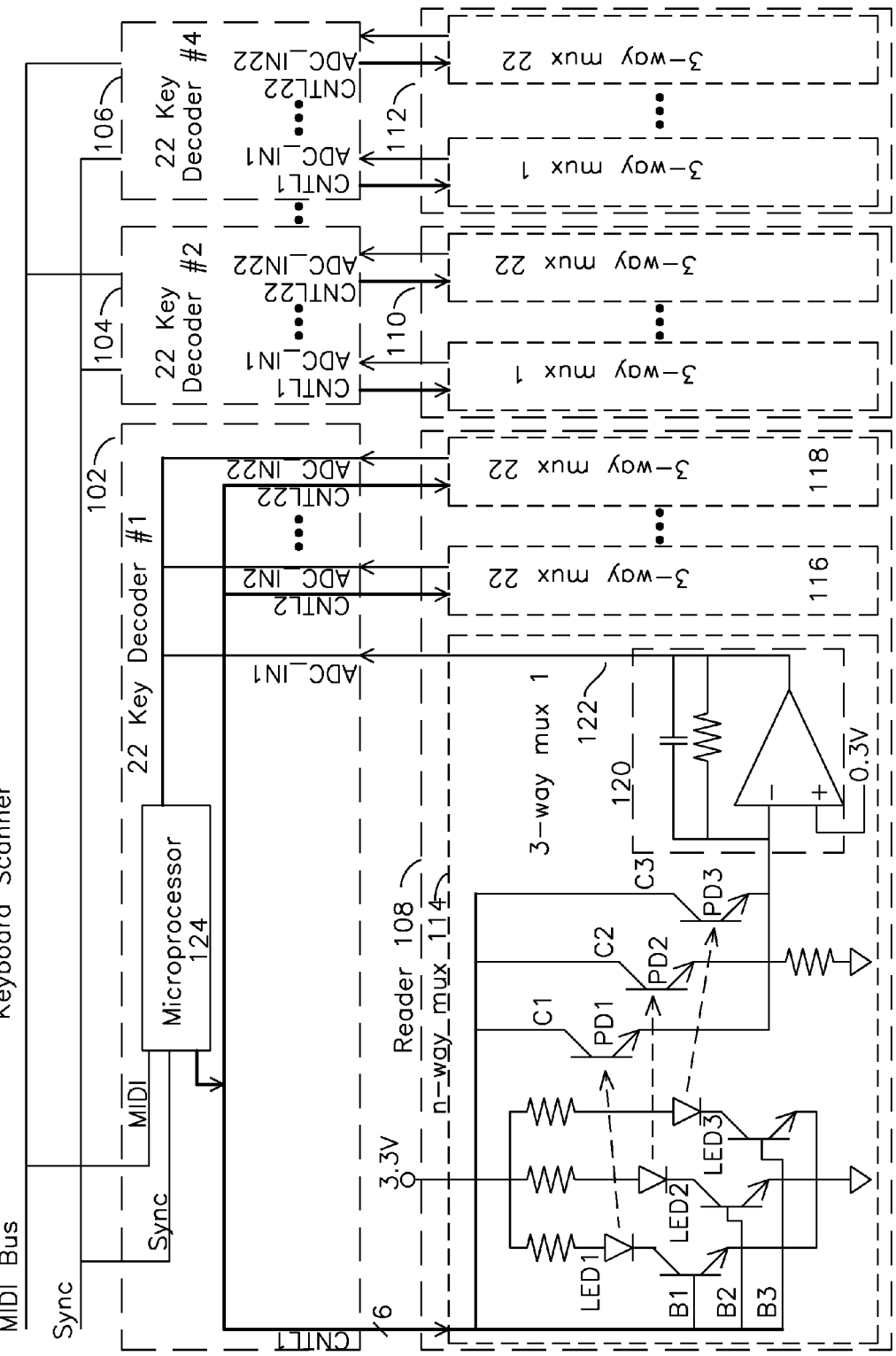
FIG. 1 shows a block diagram of a complete key sensor system.

FIG. 1 shows an overall block diagram of an embodiment of the present invention. Although any number of keys may be scanned according to the invention, the particular embodiment of FIG. 1 shows a scanner 100 for a standard 88 key piano. The 88 keys are separated into 4 22 key decoder groups, shown as 102, 104, 106, and each decoder is coupled to a reader 108, 110, 112 respectively, and each reader such as 108 contains a plurality of n-way multiplexers, shown as 3-way mux 114, 116, and 118. Each n-way multiplexer such as 114 reads a particular group of keys in sequence, which reduces the crosstalk, as will be described later. Within each n-way multiplexer are n sensors, each comprising an LED and photo detector pair corresponding to a particular key to be read. Each n-way multiplexer is controlled by a set of control signals CNTL1 through CNTL22 for the present example, and these control signals are responsible for enabling individual LEDs or photo-detectors within each n-way multiplexer.

Each sensor comprises an infrared LED transmitter such as LED1 which illuminates the bottom of a piano key, and an adjacent photo-transistor such as PD1 which converts the reflected photons into an electrical current. The other sensor LEDs and photo-transistors are similarly arranged in pairs. In each individual n-way mux, The current of the photo-transistors PD1, PD2, PD3 is summed and converted 120 into a voltage 122 that is digitized into a digital representation by an analog to digital converter (ADC) optionally located in the microprocessor 124 of each key decoder 102, 104, and 106, and the remainder of the digital processing is performed by a CPU and other resources in the microprocessor unit 124. The micro-processor 124 accepts each photo-transistor measurement after digitization, and each digital value is de-noised and then adjusted to compensate for ambient light. The digital value is then compensated for cross talk from adjacent keys. The value can be further adjusted to compensate for electrical gain of the LED and the gain variations of the photo-transistor and mechanical variations due to the piano design and manufacturing variations and natural vs. sharp notes. This numerical representation is then sampled to a microprocessor that completes the calculation to create the data to be transmitted.

The present invention can use any available microprocessor 124, preferably having at least 30 MHz clock rate, including RISC or DSP architectural features. Prior art microprocessors are small enough to easily fit on a compact circuit board mounted under the pianos keys. These microprocessors also contain ADCs, and one suitable device is a digital signal processor (DSP) from Freescale semiconductor, part number 56F8014. This part includes 8 internal ADCs and sufficient communication ports, a small power requirement, and enough memory and processing capability to perform the required functions.

The present invention can use any means for emitting light (including visible, infrared and UV light), such as an LED or laser diode. The invention can use any means for detecting and measuring light such as a photodiode or photo-transistor. The optical emitter and detector can be combined in a single device or separated into individual devices.

FIG. 2A shows a side view diagram of a white key and black key of a standard 88 key piano according to one embodiment of the present invention, where a white key 206 in a rest (up) position, a white key 208 in a down position, a black key 202 in a rest (up) position and a black key 204 in a down position. An opto-sensor unit comprising an LED 216 and associated photo-transistor 218 mounted nearby are mounted on a substrate 214. The LED/photo-transistor sensor can be configured in a variety of positions, which can be adapted to the keyboard as desired and appropriate to the instrument. Although FIG. 2A presents an embodiment of the invention with the LED photo-transistor sensor pair located below the piano keys, the source/detector pair 216/218 may be located on any surface above or below the keys, preferably in a location where the white and black keys are on a co-planar surface and with similar exposed widths, such as the unpainted wood surfaces 210 and 212 shown in FIG. 2A. Alternatively, the LED transmitter and sensor can be both or independently positioned above, below, behind (the surface of the key body farthest from the performer), or to the side of the surface of the key (or pedal) or other part of the key action, such as the hammer assembly.

In the embodiment shown in FIG. 2A, the transmitter and sensor are both positioned below the key, so the light travels upward and reflects downward from the undersurface of the key to be detected and/or measured by the sensor. Alternatively, the sensor can be positioned on either side of the fulcrum 230. This configuration has the advantages of being less intrusive to the performer, requiring less size, and being easier to install. It has the further advantage of using the uniform portion of the key, particularly between the bass keys versus the middle and treble keys.

In the embodiment shown in FIG. 2A, the system uses a co-sighted transmitter and receiver mounted on the same substrate 214. FIG. 2B shows a detail view of an up and down key from FIG. 2A. In combination, the white or black keys presents a co-planar surface, and the sensor is disposed as a linear strip, each sensor located below a key to be measured, with sensor 216/218 positioned as near to the key bottom as possible while operating in the monotonic region of the response curve, shown in FIG. 2C for the Sharp Electronics part # GP2S60. One objective of the sensor position with respect to the piano keys is to choose a diffuse reflector surface with uniform reflectivity between white and black keys, where the white and black keys present a co-planar surface, which provides uniform sensor response, and by placing the sensor as close to the key surface as possible maximizes the dynamic range of the sensor. It is also possible to provide the readers 108, 110, 112 as a strip or printed circuit substrate to be mounted across the keys to be measured. In general, selection of sensor position close to the keys is preferred, as this typically maximizes the received radiation power ratio of $(PathLength_{up}/PathLength_{down})^2$, where PathLength$_{up}$ 220 and PathLength$_{down}$ 222 are shown in detail view FIG. 2B, and in the operating points of FIG. 2C, shown as 228 for a key in the up (rest) position, and 226 for a key in the depressed (down) position.

The present sensor system signal processing addresses several problems of the prior art through the particular measurement technique. These problems are:

1) Ambient light which erroneously adds to the reflected light from the same-key LED.

2) Light reflected from different keys which adds to the same-key LED detected light, also known as cross-talk.

3) Varying sensor time response, including the slow speed of the photo-transistor under low light level conditions, which results in a limitation in sampling rate.

4) Non-linear relationship between key position and measured reflected light, which non-linearity also has the effect of amplifying error when estimating key velocity and acceleration, which are first and second derivatives with respect to time of position.

FIG. 3A shows a front cross section view of a plurality of sensors and keys, each sensor comprising an LED and phototransistor as described earlier. In the conceptually simplest of systems, all the LEDs of sensors 312, 314, 316, 318, and 320 would be continuously emitting and the receptor transistors would be enabled simultaneously. This would not be practical because an individual current to voltage converter would be required for each transistor, the drive current for the LEDs would be high, and it would not be possible to discern between the ambient light and the reflected light from the desired measurement sensor. In addition, there are several mechanical crosstalk issues, whereby reflected light from a different key adds to the reflected light from the key to be measured. FIG. 3A shows a current key x 302 for which a position measurement is desired. A measurement of reflected light Resp(x) is made using the photo-transistor associated with key x. This measurement includes reflected light from the sensor LEDs 312 and 314 from the two keys on the bass side (key x-1 and key x-2, respectively), as well as the reflected light from the two sensor LEDs 318 and 320 from the treble side of the desired measurement sensor 316. If the reflection path loss for the desired measurement key 302 is R0, and the reflection path loss for one and two keys away is R1 and R2, respectively, then the equation 322 shows the total contribution to the light measurement at key x. Term 328 is the desired measurement term, and terms 324, 326, 330, and 332 are unwanted contributions from adjacent keys.

FIG. 3B shows a multiplexed keyboard sensor for 3-way multiplexing, although this can be generalized for any number n ways of multiplexing by additional LED and photo-transistor sensor pairs to each n-way multiplexer such as 114. For 3-way multiplexing, the adjacent keys are grouped into multiplexing groups 340, 342, 344, 346, and each group has an ordering, such that only one LED in a particular group is enabled at a particular time. For example, at time T1 348, only LED1 for groups 340, 342, 344, and 346 is enabled. At time T2 350, only element 2 of each group is enabled, and at time T3, only element 3 is enabled. As can be seen in equation 354, desired term 360 contributes to the light for selected element x, corresponding to the associated LED element x which is illuminated, thereby reducing adjacent reflection terms 356, 358, 362, and 364 to 0. The response of the selected element 354 thereby contains only the reflected light contribution from the selected key. In this manner, each of the element 1 keys from each group can be read, followed by the element 2 keys, followed by the element 3 keys. The multiplexing of LEDs is performed as shown in FIG. 1 by each of the key decoder groups, whereby CNTL1 for each group contains a signal shown as B1, B2, B3, which enables each associated LED through a switch element, such as a transistor, FET, or CMOS device output.

Figure 3C:
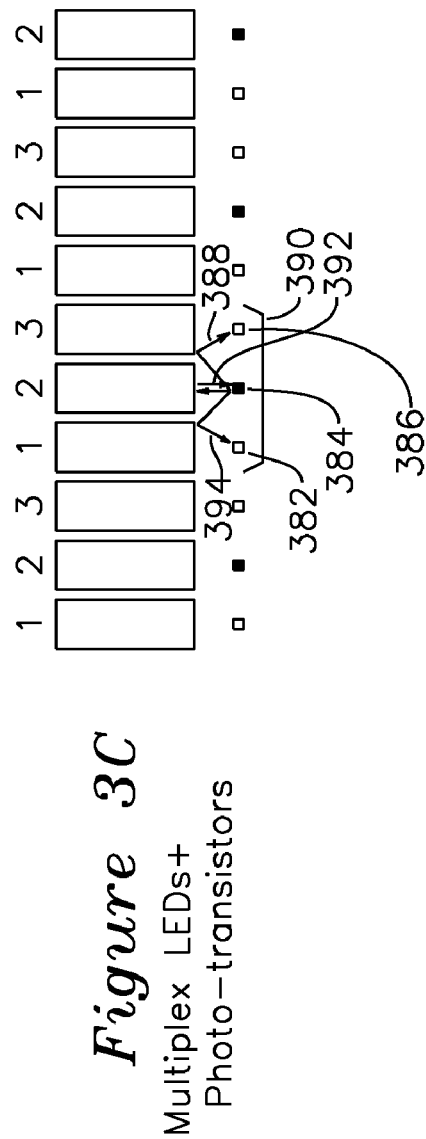
FIG. 3C shows a cross section of keys with LED and photo-transistor multiplexing

FIG. 3C shows the adjacent photo-transistor contribution to measurement error which results from summing photo-transistor currents together within a single multiplexing group. Although the problem of unwanted optical energy from adjacent LEDs is resolved by multiplexing LEDs as was shown in FIG. 3B, within a single multiplexing group 390, the optical energy from the single sensor LED 384 illuminates photo-transistors 382 in the same group via path 394 and photo-transistor 386 via path 388. If the photo-transistors in a group are connected together in this manner, the reflection from adjacent keys would result in responses from the other detectors and sum together in amplifier 120 of FIG. 1.

Figure 3D:
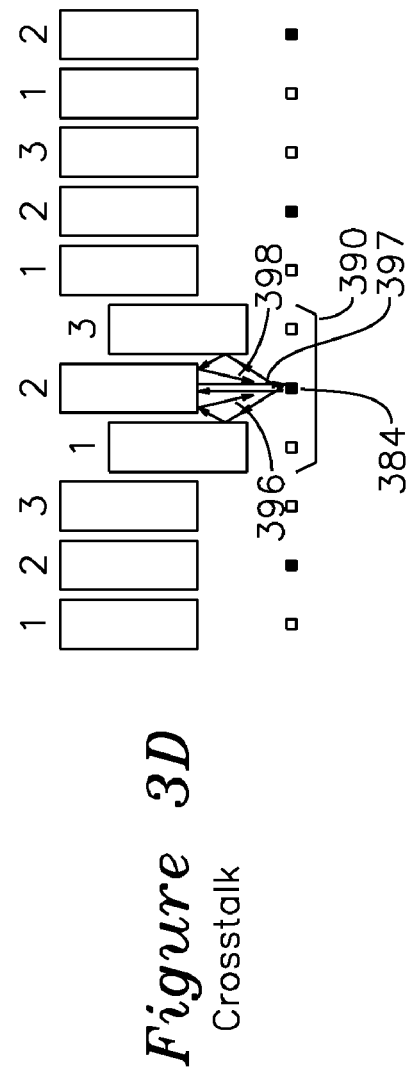
FIG. 3D shows a cross section of keys illustrating crosstalk from a single optical source.
Figure 3E:
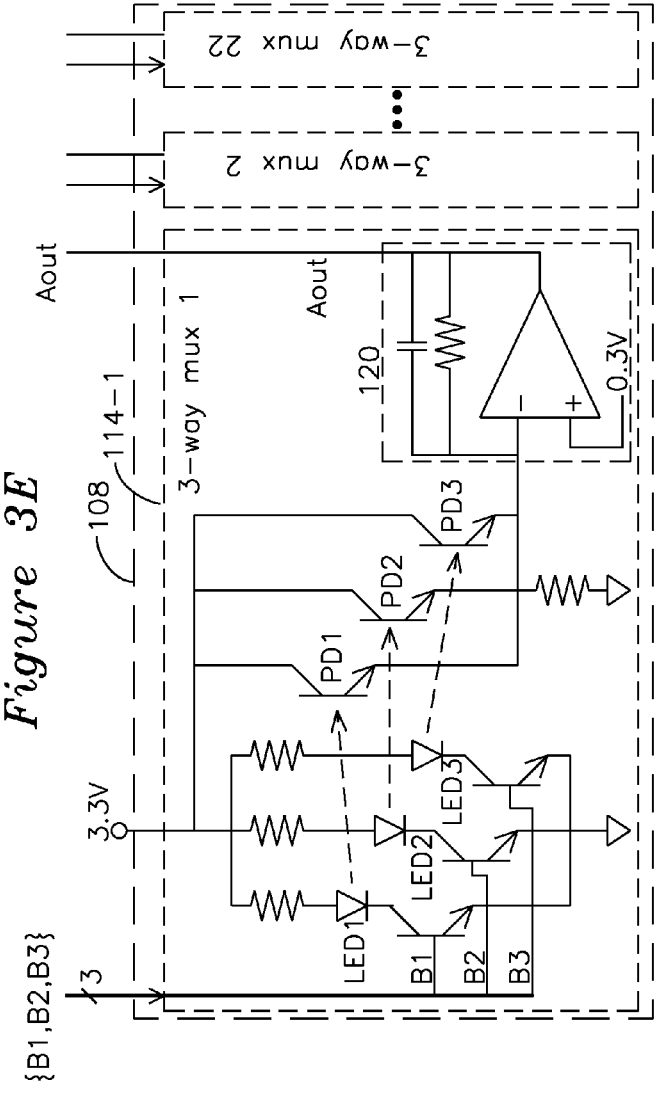
FIG. 3E shows the schematic of an n-way multiplexer.
Figure 3F:
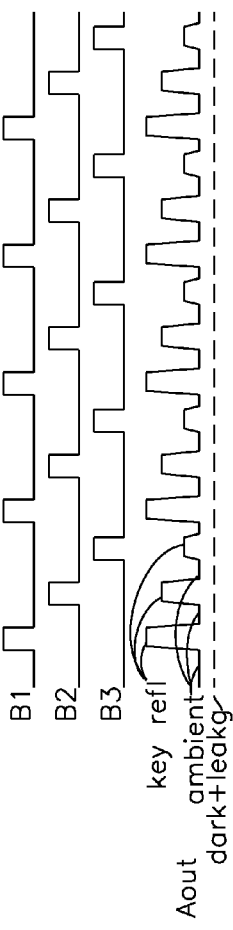
FIG. 3F shows the waveforms for FIG. 3E.

FIG. 3E shows a schematic diagram and related waveforms in FIG. 3F for the multiplexed LED case described in FIG. 3B. The LEDs within a group are enabled sequentially, resulting in the elimination of adjacent-key LED error. This circuit has the disadvantage that it reads the ambient light for the SUM of PD1, PD2, and PD3. In addition, assuming PD1, PD2, and PD3 are mounted sequentially on the circuit board, they may also pick up crosstalk energy transmitted by PD0 (next to PD1), and light reflected from PD2's associated LED into the receivers of PD1 and PD3. The non-inverting input of the op-amp of current to voltage converter 120 and the collector voltage of PD1, PD2, PD3 contributes to a detector response time. For minimum response time, the collector to emitter voltage should be on the higher range of the allowed operational limits for the photo-transistor. For a collector voltage of 3.3V, and a summing junction voltage (set by the non-inverting input voltage shown as 0.3V), the Vce of the phototransistor will be 3.0 volts.

Figures 3G, 3H:
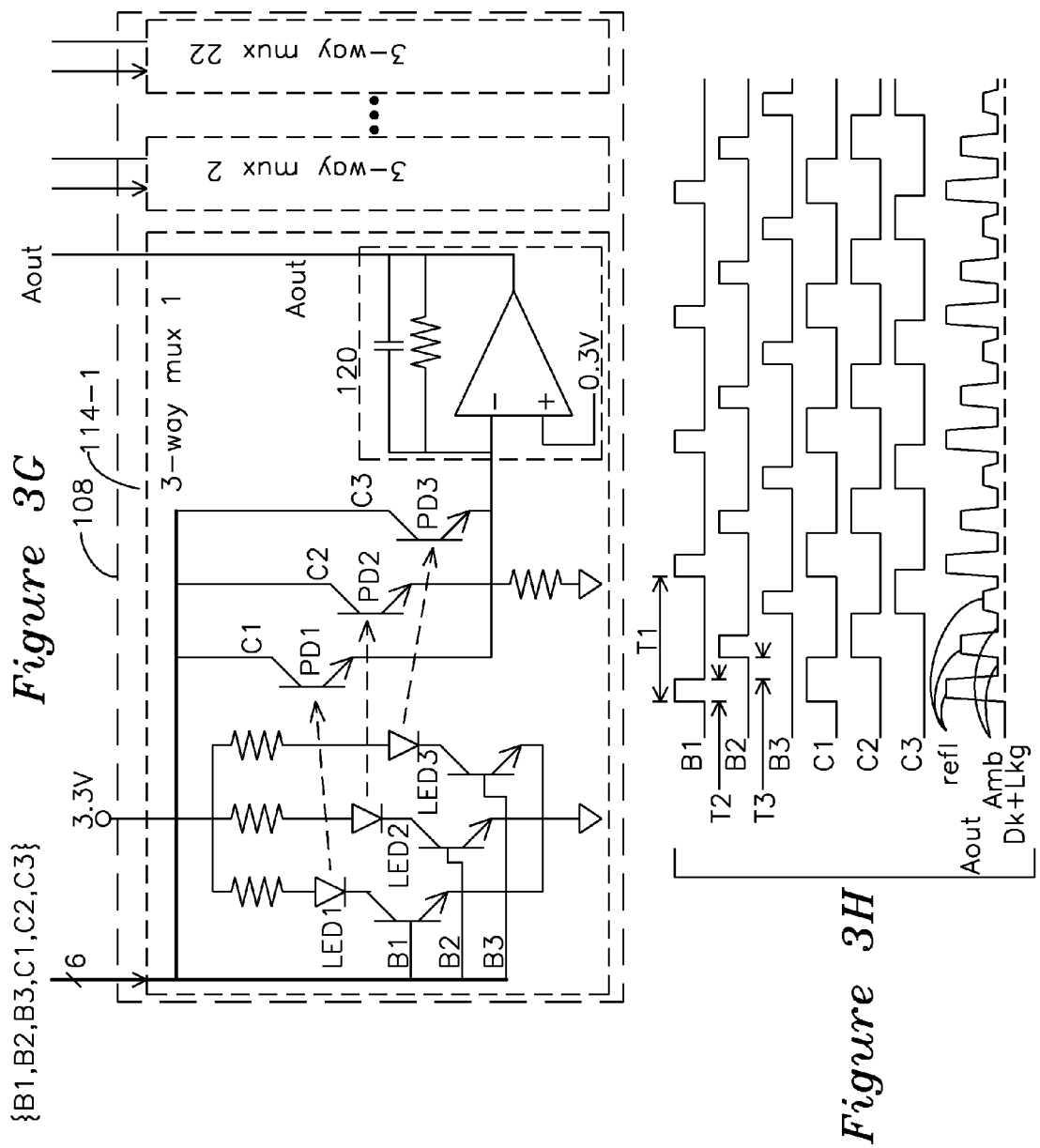
FIG. 3G shows the schematic for a preferred embodiment of an n-way multiplexer.
FIG. 3H shows the waveforms for FIG. 3G.

The reflected light contribution from a particular enabled LED which couples to photo-transistors such as PD2 of FIG. 3E causing PD1 and PD3 to also respond may be addressed by enabling the LED and associated multiplexer in pairs, as shown in best mode FIG. 3G with related waveforms 3H. The 3-way multiplexer 114-1 receives control signals {B1, B2, B3, C1, C2, C3} whereby B1 and C1 are simultaneously asserted during one measurement interval, followed by the pairs B2 and C2, and finally B3 and C3. The C1, C2 and C3 lines each virtually connect their corresponding sensing receiving transistors individually to the op-amp. For instance, setting C1 high and C2 and C3 low forward biases PD1, and back-biases PD2 and PD3. This effectively multiplexes the individual photo-transistors PD1, PD2, PD3 to the ADC. In this manner, each LED and photo-transistor pair is enabled, allowing the improved measurement of reflected light from a single key. It is possible to reduce the control signal count by having the LED and associated photo-detector share a single control line, as in one embodiment of the invention shown in FIG. 3H, these signals have identical timing.

FIG. 3H also indicates system timing. The interval T2 represents an LED ON time, and T3 represents the ambient background light measurement time. For an n-way multiplexer, the scan time T1=n(T2+T3). As the level of multiplexing increases, the number of ADCs is reduced, but the scan time T1 increases. Similarly, shorter T3 times may result in shorter scan times, but with less accurate ambient light correction. As the system can perform entire keyboard scans in less than 300 us, there is opportunity to optimize a particular keyboard scanner characteristics, flexibility which is not available in the prior art.

FIG. 3D shows a remaining error source known as crosstalk, or mechanical crosstalk. A single LED of sensor 384 is enabled and emitting light, and if the radiation pattern of the LED is broader than the associated key to be measured, or if scattering occurs in the radiated energy, return energy from adjacent keys may occur. In FIG. 3D, light directed to rest key 2 is scattered or radiated to adjacent down keys 1 and 3, resulting in crosstalk optical energy 396 and crosstalk optical energy 398, which adds to desired optical energy 397 from the key to be measured.

Ignoring for now mechanical crosstalk, the first order of multiplexing is to individually enable the LEDs and sample the current in the associated photo-transistor receiving reflected light from the key to be measured. In the present invention, the sample time is related to the optical detector settling time. The consequence of this relationship is that greater accuracy in the form of additional bits of digitizing requires longer sample times. For example, the sample time for the phototransistors is on the order of 10 microsecond (uS) settling time for 8 bit digitizing accuracy, and on the order of 15 uS for 12 bit accuracy, and 12 bit resolution is used because of the additional dynamic range requirement associated with sensing ambient light levels and reflections over required distance ranges.

FIG. 4A shows the Ic vs turn-on settling time characteristics of a phototransistor under varying input optical illumination conditions, and FIG. 4B shows the Ic vs time turn-off settling time characteristics for various levels of optical illumination. It can be seen that the photo-transistor settling time increases with lower optical power levels, and the phototransistor response time for turn-off of FIG. 4B is lower than the turn-on time of FIG. 4A. The low level response time of the photo-transistor becomes relevant when measuring ambient light by comparing the photo detector readings with the LED on and LED off. One method to measure the ambient light is to first read the ambient light then turn on the LED then measure the light due to the LED. As can be seen from the low optical power settling time of FIGS. 4A and 4B, the sensor is very slow in responding to low light levels. To reduce the settling time, it is possible to first assert the signal EN_LED of FIG. 4C, measure the light using the ADC coupled to the output of 120, and then de-assert the EN_LED line and measure the dark current or ambient light. The timing diagram for FIG. 3H shows an on-time T2, during which a reflective measurement including ambient light is made, followed by T3, during which the ambient light measurement is made.

The present invention reduces interference arising from ambient light by measuring the ambient light during each measurement cycle. A typical measurement cycle duration T1 of FIG. 3H may span 0.1 ms to 10 ms, or particular user-selectable discrete intervals such as 0.1, 0.2, or 0.5 millisecond and 1, 2, 5 or 10 milliseconds. This is achieved by turning the light source on at one point of the cycle to measure the light level due to the combination of ambient and desired reflected light during T2, which provides initial data on the position of the key. Then, the light is turned off at another point of the cycle, measuring the ambient light (the "dark" current) during T3. This allows the transistor to bleed off current in the base region of the transistor with the transistor biased on.

Thus, the invention provides an effective correction for ambient light, even when ambient light conditions for each key may change during, and indeed throughout, the course of performance.

Although each key has its own set of LED transmitter and photo-transistor, each set does not necessarily operate independently; rather there can be interaction between them. Accordingly, the invention also provides a method to essentially isolate each of the sensing transistors to eliminate current due to crosstalk. As was shown in FIG. 3D, "Crosstalk" describes undesirable light detected from surfaces of neighboring keys and from the light sources associated with neighboring keys, such as keys on one, two, or more keys in either direction. Thus, crosstalk can result in inaccurate measurements of the position of a key.

Figure 5:
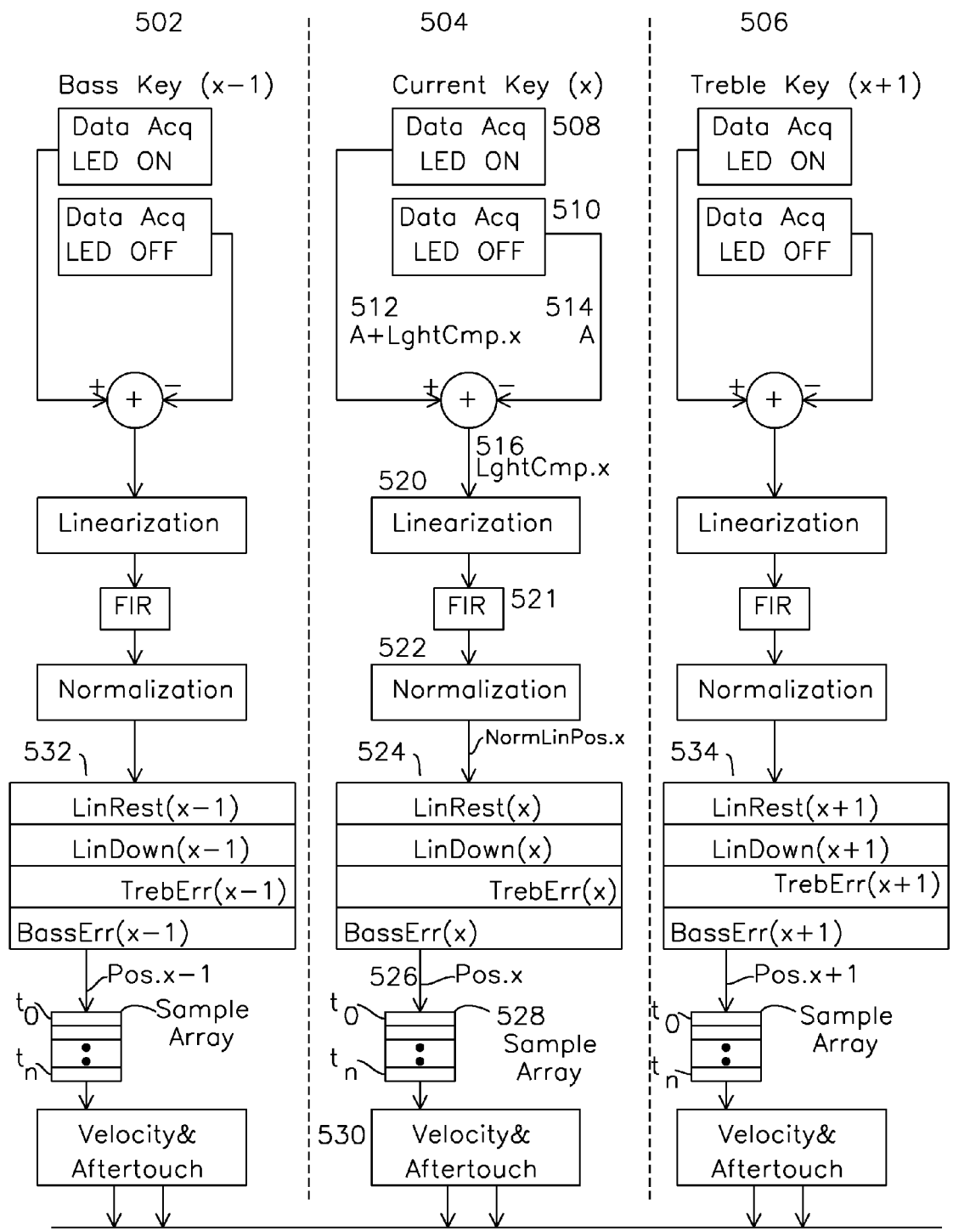
FIG. 5 shows a block diagram for crosstalk reduction, including generating positional data from a cross-talk corrected value.

The present invention reduces the undesirable effects of crosstalk for a measured key by detecting light from neighboring keys and removing it from the light measurement of the measured key, as shown in FIG. 5. Examining a single key process 504, a measurement is made for a particular key by turning an LED ON 508 and taking a measurement of reflected plus ambient (A+LghtCmp.x) 512, then turning the LED OFF 510 and reading ambient only (A) 514. The subtraction of A 514 from A+LghtCmp.x 512 results in LghtCmp.x 516, which requires linearization 520 to compensate for the non-linear reflectance characteristic shown in FIG. 2C, scaling and normalization 522 to compensate for the range of the particular sensor, and still includes crosstalk values, as described earlier. Optionally, an FIR 521, or any type of filter which provides smoothing of digitized response may be positioned as shown. After linearization 520 and normalization 522, which will be described later, and before using the system in normal operation mode, it must be adjusted during an adjustment phase by determining a matrix of crosstalk values for each key, shown as 532, 524, and 534. During the adjustment phase of operation the system calibrates crosstalk and key reflectivity limits associated with the particular keyboard operating environment. The adjustment procedure is initiated by a command being sent to the microprocessor from its external controller.

The adjustment procedure, which is performed for each key, and shown for current key (key x) in FIG. 5 comprises the steps:

1) Measure the position of each key when all of the keys are in rest (up) position, thereby getting a LinRest.x value for each key.
2) In sequence, press each key fully down individually, measuring its
   a) Post-linearized Down position (LinDown.x)
   b) BassError.(x+1): crosstalk contribution current key x makes to the key (x+1) above it
   c) TrebError. (x−1) : crosstalk contribution the current key x makes to the error from the key x−1 below it
3) Store the results (such as in nonvolatile memory)
4) When the adjustment procedure is completed, switch to normal operation mode.

In this manner, for each key, a dataset of 4 adjustment values per key depression are collected, two of which are stored for the present key x (LinRest.x and LinDown.x), and two of which are stored for adjacent keys (BassErr.x+1 and TrebErr.x−1).

In the below equations, the notation used is as follows:

LghtCmp.x represents the value from the present key x associated ADC output (with range 0 to 4095, or 0x0 to 0xfff in hex notation), corrected for ambient light, as described above.

LinPos.x represents the linearized value of reflected light, which compensates for the $1/r^2$ variation of reflected light with key position.

LinRest.x and LinDown.x are LinPos.x at the rest and down positions, respectively.

KeyComp.x represents a scaling term which is applied to generate the normalized linear value NormLinPos.x BassErr.x represents the value of NormLinPos.(x−1) when key x only is depressed. BassErr.x is initialized to 1 greater than LinRest.x.

TrebErr.x represents the value of NormLinPos.(x+1) when key x is depressed exclusively BassComp.x is an interim calculation derived in part from BassErr TrebComp.x is an interim calculation derived in part from TrebErr Pos.x is the linearized position, corrected for adjacent reflection crosstalk, and calculated from the above variables and having a range of 0 to 16.

As used below, LghtCmp.x is used to indicate the reflected light for key number x, where adjacent keys are indicated by x−1 (below) and x+1 (above).

Using the matrix obtained during the initialization phase, subsequent light measurements for each key can be corrected to provide position data (Pos.x) as follows:

$$LghtCmp.x = LightOn.x - LightOff.x \quad \text{(Eqn 1)}$$

$$LinPos.x = 0 \times 900 - \frac{0 \times 04000}{\sqrt{LghtCmp.x}} \quad \text{(Eqn 2)}$$

$$KeyComp.x = \frac{0 \times 100}{LinDown.x - LinRest.x} \quad \text{(Eqn 3)}$$

$$NormLinPos.x = (LinPos.x - LinRest.x) * KeyComp.x \quad \text{(Eqn 4)}$$

-continued $$BassErr.x = NormLinPos.(x-1) \text{ when key } x \text{ depressed exclusively} \quad \text{(Eqn 5)}$$

$$TrebErr.x = NormLinPos.(x+1) \text{ when key } x \text{ depressed exclusively} \quad \text{(Eqn 6)}$$

$$BassComp.x = KeyComp.(x-1)*(BassErr.x - LinRest.(x-1)) \quad \text{(Eqn 7)}$$

$$TrebComp.x = KeyComp.(x+1)*(TrebErr.x - LinRest.(x+1)) \quad \text{(Eqn 8)}$$

$$Pos.x = NormLinPos.x - BassComp.x*((NormLinPos.x-1) - NormLinPos.x)) - TrebComp.x*((NormLinPos(x+1) - NormLinPos.x) \quad \text{(Eqn 9)}$$

where in one embodiment :

LghtCmp range: 0x0 to 0xfff

LinPos range 0x0 to 0x800

KeyComp range: 0x0 to 0xff

Pos.x range: 0x0 to 0xff

In the above equations, equation 1 articulates the measurement of ambient plus reflected light during the T2 interval of FIG. 3H less the ambient light measured during the T3 interval. Equation 2 provides a linearized position value, where the square root function compensates for the non-linear reflection vs position response shown in FIG. 2C. Equation 3 provides a scaling term KeyComp.x which is used in equation 4 to generate a normalized and scaled key position value NormLinPos.x. This value is then used in equations 5 and 6 to generate the contribution to adjacent key crosstalk terms. Equation 9 expresses the key position Pos.x by subtracting the crosstalk terms BassComp.x and TrebComp.x, computed in equations 7 and 8.

As used in the example calculation above, Pos.x represents a scaled distance between the key and the sensor, where 0=depressed to the bottom and 16=rest position.

It should also be noted that because the invention provides corrections for each key individually, it is equally applicable to white and black keys, regardless of whether the adjacent key is black or white. Moreover, the invention adapts to surfaces of keys with different finishes or having different reflective properties due to variations in manufacture or design.

One embodiment of the invention further provides a method for quickly computing the square root required in equation 2 to convert each of the values LghtCmp.x 516 of FIG. 5 into linear value LinPos.x for application of the crosstalk corrected value to generate the value Pos.x. Because the multiply and divide operations of equations 2 through 9 may be performed quickly using existing instructions to perform these operations, the problem of computing square roots in equation 2 quickly is not so quickly accomplished. Empirical measurements of ADC output are provided below, along with theoretical output based on an inverse-square model. To measure the amount of energy and want to calculate the distance, energy measured by the receptor (Y) is proportional to the inverse-square of the distance (X) from the transmitter.

$$Y = K1/X^2$$

Solving this equation for X:

$$X = K2/(Y^{0.5}), \text{ where } K2 = K1^{0.5}$$

| KeyDip Inches | ADC Meas | Theoretical |
|---|---|---|
| 0.01 | 101 | 198 |
| 0.02 | 117 | 204 |
| 0.03 | 135 | 210 |
| 0.04 | 144 | 216 |
| 0.05 | 151 | 222 |
| 0.06 | 157 | 229 |
| 0.07 | 167 | 237 |
| 0.08 | 185 | 244 |
| 0.09 | 223 | 252 |
| 0.10 | 213 | 260 |
| 0.11 | 256 | 269 |
| 0.12 | 257 | 278 |
| 0.13 | 283 | 288 |
| 0.14 | 304 | 298 |
| 0.15 | 319 | 309 |
| 0.16 | 355 | 320 |
| 0.17 | 367 | 332 |
| 0.18 | 391 | 345 |
| 0.19 | 415 | 358 |
| 0.20 | 433 | 373 |
| 0.21 | 446 | 388 |
| 0.22 | 461 | 404 |
| 0.23 | 471 | 421 |
| 0.24 | 488 | 439 |
| 0.25 | 501 | 458 |
| 0.26 | 521 | 479 |
| 0.27 | 537 | 501 |
| 0.28 | 557 | 524 |
| 0.29 | 579 | 549 |
| 0.30 | 603 | 577 |
| 0.31 | 634 | 606 |
| 0.32 | 653 | 637 |
| 0.33 | 687 | 671 |
| 0.34 | 720 | 708 |
| 0.35 | 759 | 748 |
| 0.36 | 803 | 791 |
| 0.37 | 850 | 838 |
| 0.38 | 904 | 890 |
| 0.39 | 952 | 946 |
| 0.40 | 1019 | 1008 |
| 0.41 | 1088 | 1077 |
| 0.42 | 1162 | 1152 |
| 0.43 | 1206 | 1236 |
| 0.44 | 1291 | 1329 |
| 0.45 | 1399 | 1434 |
| 0.46 | 1516 | 1551 |
| 0.47 | 1654 | 1683 |
| 0.48 | 1800 | 1832 |
| 0.49 | 1959 | 2002 |
| 0.50 | 2158 | 2198 |
| 0.51 | 2397 | 2423 |
| 0.52 | 2685 | 2685 |
| 0.53 | 2981 | 2991 |
| 0.54 | 3282 | 3353 |
| 0.55 | 3500 | 3786 |

The preceding table shows empirical measurements of the response curve compared to an inverse square law. The first column is depression of a key as was measured in inches approx 2 inches from the front of a white key or equivalent on a black key. The second column is the numerical out of the 12 bit ADC sampling a sensor mounted under the key as shown in FIG. 1. The third provides a theoretical numerical output based on scaled square law response. As shown, there was a very good correlation between the empirical measurements and the values obtained from the scaled inverse-square model.

A scaled inverse square model that can be used is $$X = K/Y^{0.5}$$

Where Y is the value linearly related to the current flowing in the transistor due to reflected energy from the key being measured by the 12-bit ADC, ranging from 0 to 4096

Where X is represents the position of the key.

K is a constant to provide correct scaling of the linear position and can be determined empirically by skilled engineers for the desired application and the DSP chip being used. The formula can be implemented in commercially available chips. However, if a desired DSP chip does not have hardware divide or square root capability, the equation can be transformed to:

$$X = K_e^{-\frac{ln(X)}{2}}$$

And can be implemented with the following exemplary C code (as known in the prior art and described in many references, including http://www-ccs.ucsd.edu/c/):

```
unsigned int LinearizeSensorData(unsigned int input)
{
    return    (0x800-AntiLogVel(0x0E00-(log256(input)
        >>1)));
}
unsigned int ExpoizeSensorData(unsigned int input)
{
    return (AntiLogVel(7168-(log256(0x800-input)<<1)));
}
unsigned int log256(unsigned int arg)
{
    int pow=0xb;
    if(arg==0)
        arg++;
    if(arg & 0xf000)
    {
        pow=0xf;
        while(!(arg & 0x8000))
        }
            pow--;
            arg+=arg;
        }
        arg=0xff & (arg>>7);
    }
    else
    {
        while(!(arg & 0x0800))
        {
            pow--;
            arg+=arg;
        }
        arg=0xff & (arg>>3);
    }
    if(arg!=255)//A 255 turned into 256 and that is bad
        arg=((171*arg)>>7)-((171*((arg*arg)>>8))>>9);
    return arg=(pow<<8)|(0xff & arg);
}
unsigned int AntiLogVel(unsigned int arg)
{
unsigned int argg,arggx;
int pow=arg>>8;
if(arg>0x8000)
    return 0;
if(arg>0x0fff);
else
{
    argg=0xff & arg;
    arggx=((171*argg)>>8)+((172*((argg*argg)>>8))>>9);
}
if(pow<=8)
    return arg=(0x100|(0xff&arggx))>>(8-(arg>>8));
else
    return arg=(0x100|(0xff & arggx))<<((arg>>8)-8);
}
```

More specific information about MIDI can be found in U.S. Pat. No. 5,231,283, which is hereby incorporated by reference.

Thus, the present invention provides position information. When time information is also considered, the invention can provide velocity and acceleration information for use in electronic musical data formats according to protocols and formats known in the art.

In summary, the advantages provided by the present system over the prior art are:

1) The ability to accurately measure key motion in time and velocity, in particular meeting the following requirements:
   a) Time of the attack of the note with significantly less than 5 mSec timing error
   b) Accurate measurement of the position of the key when the hammer reaches the string.

2) Sufficient linearity correction to compensate for the mechanical variations within the keyboard, particularly with regard to the problem of:
   a) Black keys travel farther than white keys
   b) Keydip variations to the regulation of the piano action 3) A scan rate sufficient to accurately determine velocity, for which 3-way multiplexing is believed to be the best mode.

4) The ability to trade off between scan rate and positional resolution, whereby longer settling times result in greater measurement accuracy but reduced scan rate. The timings T1, T2, and T3 of FIG. 3H are independently controllable.

5) Accurate measurement of key position is critical to accurate estimate of acceleration. If the key is being accelerated linearly a 10% error is position equates to a 29% error in velocity. It is important to accurately provide positional information for both solenoid player mechanisms which generate distinctly different velocity profiles than keys being played by humans, as well as accommodate the wide techniques of humans.

6) Crosstalk or interference from adjacent keys is fully compensated in the present system. This is critical for useful operation of a reflective system.

7) The sample rate of the system must be high, however the photo-transistors have a slow response time if not electrically biased properly. Using a photo-transistor with a simple resistor pullup can cause response time in the milliseconds leading to expensive multiplexing systems. This invention describes a very low cost, low part count, and high speed multiplexing system 8) Noise on the ADC is a critical problem. The preferred embodiment of the present invention uses a 12 bit ADC where none of the electrical signal travel farther that 8 inches and the voltage are all below 5 volts and current requirements is very low, typically below 200 ma.

9) In prior art systems the mechanics of the LED/Photo-transistor pair was not tightly controlled. The prior art devices must be precisely aligned to insure consistent transfer curves, in contrast with the simple adjustment procedure of the present invention, sequentially pressing each individual key down which provides a complete calibration of the particular keys being measured.

10) The present system measures background ambient light with every sample (shown as T3 of FIG. 3H). This is important because during a performance on a stage, often bright lights shine on the piano, leaking under the keys and into the sensors.

11) There are other aspects that have been ignored by previous scanning systems, and are incorporated into the adjustment or operation of the present system, such as:

a) Damper liftoff height
b) Damper release position controlling the decay of the note.
c) An early detection to record the sound of the action of the piano before the hammer strikes the string.
d) Calculation of velocity from a partially released key The description of the embodiments of the present invention are provided for understanding of the invention, and do not limit the invention. In particular, the n-way multiplexer is shown for n=3, however smaller or larger numbers of multiplexers are possible, and the key measurement function such as 114-1 of FIG. 3G may be practiced in combination or individually. Similarly, the ambient light measurement technique which reduces measurement time as described in the FIG. 3H utilization of T2 and T3 may be practiced individually or in combination with the other elements of the present invention. The crosstalk compensation as described for FIG. 5 or in the equations 1 through 8 may be practiced individually or in combination with the other aspects of the invention. The positional conversion algorithm of the example program may be practiced individually or in combination with other elements of the invention.

I claim:

1. A method for reducing crosstalk from an adjacent movable bass surface and an adjacent movable treble surface to a movable current surface, the movable bass, movable treble, and movable current surfaces a subset of an array of movable surfaces, the method comprising:
   associating with each said movable bass, treble, and current surface:
   a BassErr value;
   a TrebErr value;
   a linearized and normalized measurement NormLinPos for each said current, said bass, and said treble movable surface, each said measurement NormLinPos derived from the output of each optical detector principally coupled to light reflected from a corresponding said current, said bass, and said treble movable surfaces;
   computing a bass key crosstalk correction value by multiplying said current movable surface BassErr value by the difference between said bass movable surface NormLinPos and said current movable surface NormLinPos;
   computing a treble key crosstalk correction value by multiplying said current movable surface TrebErr value by the difference between said movable treble surface NormLinPos and said movable current surface NormLinPos;
   forming a corrected position value by subtracting said bass key crosstalk correction value and said treble key crosstalk correction value from said current movable surface NormLinPos value.

2. The method of claim 1 where said bass key crosstalk correction value is BassComp.x computed from:

$$LghtCmp.x = LightOn.x - LightOff.x$$

$$LinPos.x = 0 \times 900 - \frac{0 \times 04000}{\sqrt{LghtCmp.x}}$$

$$KeyComp.x = \frac{0 \times 100}{LinDown.x - LinRest.x}$$

$$NormLinPos.x = (LinPos.x - LinRest.x) * KeyComp.x$$

$$BassErr.x = NormLinPos.(x - 1)$$

$$BassComp.x = KeyComp.(x - 1) * (BassErr.x - LinRest.(x - 1))$$

where:
each said suffix .x is associated with said current movable surface, each said suffix .(x−1) is associated with said adjacent bass movable surface;
LightOn is an optical detector measurement of an associated movable surface with an optical source enabled;
LightOff is an optical detector measurement of an associated movable surface with an optical source disabled;
LinRest is a linearized resting position measurement for an associated movable surface;
LinDown is a linearized down position measurement for an associated movable surface.

3. The method of claim 1 where said treble key crosstalk correction value is TrebComp.x computed from:

$$LghtCmp.x = LightOn.x - LightOff.x$$

$$LinPos.x = 0 \times 900 - \frac{0 \times 04000}{\sqrt{LghtCmp.x}}$$

$$KeyComp.x = \frac{0 \times 100}{LinDown.x - LinRest.x}$$

$$NormLinPos.x = (LinPos.x - LinRest.x) * KeyComp.x$$

$$TrebErr.x = NormLinPos.(x + 1)$$

$$TrebComp.x = KeyComp.(x + 1) * (TrebErr.x - LinRest.(x + 1))$$

where:
each said suffix .x is associated with said current surface, and each said suffix .(x+1) is associated with said adjacent treble surface;
LightOn is an optical detector measurement of an associated movable surface with an optical source enabled;
LightOff is an optical detector measurement of an associated movable surface with an optical source disabled;
LinRest is a linearized resting position measurement for an associated movable surface;
LinDown is a linearized down position measurement for an associated movable surface.

4. The method of claim 1 where a key position pos.x is calculated from:

$$LghtCmp.x = LightOn.x - LightOff.x$$

$$LinPos.x = 0 \times 900 - \frac{0 \times 04000}{\sqrt{LghtCmp.x}}$$

$$KeyComp.x = \frac{0 \times 100}{LinDown.x - LinRest.x}$$

$$NormLinPos.x = (LinPos.x - LinRest.x) * KeyComp.x$$

$$BassErr.x = NormLinPos.(x - 1)$$

$$TrebErr.x = NormLinPos.(x + 1)$$

$$BassComp.x = KeyComp.(x - 1) * (BassErr.x - LinRest.(x - 1))$$

$$TrebComp.x = KeyComp.(x + 1) * (TrebErr.x - LinRest.(x + 1))$$

$$Pos.x = NormLinPos.x - BassComp.x * ((NormLinPos.x - 1)$$
$$- NormLinPos.x)) - TrebComp.x * ((NormLinPos(x + 1)$$

-continued $$-(NormLinPos.x))$$

where:
each said suffix .x is associated with said current movable surface, each said suffix .(x−1) is associated with said adjacent bass movable surface, and each said suffix .(x+1) is associated with said adjacent treble movable surface;
LightOn is an optical detector measurement of an associated movable surface with an optical source enabled;
LightOff is an optical detector measurement of an associated movable surface with an optical source disabled;
LinRest is a linearized resting position measurement for an associated movable surface;
LinDown is a linearized down position measurement for a surface.

5. The method of claim 1 where said BassErr value and said TrebErr value are computed during a calibration step.

6. The method of claim 1 where a calibration step is performed which provides for each said subset of movable surfaces:
said BassErr value;
said TrebErr value;
a current movable surface LinRest value derived from said optical detector output when an associated movable surface is in a rest position; and
a LinDown value derived from said optical detector output when an associated movable surface is in a depressed position.

7. The method of claim 1 where a calibration step is performed whereby said current movable surface BassErr value is determined by measuring said optical detector output for said current movable surface when said bass movable surface is in a down position and said current movable surface is in a rest position.

8. The method of claim 1 where a calibration step is performed whereby said current movable surface TrebErr value is determined by measuring said optical detector output for said current movable surface when said treble movable surface is in a down position and said current movable surface is in a rest position.

9. The method of claim 1 where said linearized and normalized measurement NormLinPos is formed from a linearization step of an inverse square root of said optical detector output followed by a normalization step which utilizes the linearized optical detector output associated with a movable surface rest position response and a movable surface down position response.

10. The method of claim 1 where each said optical detector coupled to light reflected from said current, said bass, and said treble movable surface is primarily responsive to reflected light from an associated optical source co-sighted with each said optical detector, and only one said optical source and associated optical detector is active at a particular time.

11. The method of claim 10 where each said optical detector output is determined by subtracting a value taken when said associated optical source is disabled from a value taken when said associated optical source is enabled.

12. A method for making a distance measurement to a current movable surface and removing crosstalk from a bass movable surface and a treble movable surface, said current movable surface adjacent to said bass movable surface and also said treble movable surface, each said current movable surface, said bass movable surface, and said treble movable surface having an associated optical source and optical detector for receiving said optical source energy reflected primarily from each said associated movable surface, the method comprising:
associating which each current movable surface a LinRest value, a LinDown value, a TrebErr value, and a BassErr value;
for each said current movable surface, a calibration step which includes:
a rest position step where a photodetector response associated with a current key is linearized and saved as said LinRest value when said current movable surface, said treble movable surface, and said bass movable surface are in a rest position;
a key down step where the photodetector response associated with a current key is linearized and saved as said LinDown value when said current movable surface is in a down position and said treble movable surface and said bass movable surface are in a rest position, and during said single key down step also measuring the photodetector response associated with said bass movable surface, linearizing said response, and saving said value as a bass movable surface TrebErr value, also measuring the photodetector response associated with said treble movable surface and saving said value as a treble movable surface BassErr value;
performing said calibration step for said adjacent keys where said adjacent key is used as a current movable surface in a subsequent said calibration step;
a subsequent operational step where a current movable surface photodetector response is corrected for crosstalk by subtracting a treble photodetector response and also a bass photodetector response from said current movable surface photodetector response.

13. The method of claim 12 where said operational step includes, for each photodetector, removing an ambient optical energy error by subtracting a photodetector response when an associated optical source is disabled from the photodetector response when said associated optical source is enabled.

14. The method of claim 12 where said bass photodetector response is computed for a current movable surface by multiplying said BassErr value by the difference between said NormLinPos of said bass movable surface and the NormLinPos of said current movable surface.

15. The method of claim 12 where said treble photodetector response is computed for a current movable surface by multiplying said TrebErr value by the difference between said NormLinPos of said treble movable surface from the NormLinPos of said current movable surface.

16. The method of claim 12 where said NormLinPos for the photodetector of a movable surface is derived by removing an ambient light error by measuring the difference between said photodetector response when an associated optical source is disabled from the response when said optical source is enabled, said difference is linearized to correct for a non-linear relationship between a reflected optical measurement and movable surface position, and thereafter normalized to a range by using said LinRest and said LinDown values.

17. A method for removing crosstalk from a plurality of movable surfaces, said plurality of movable surfaces being divisible into a subgroup comprising:
a bass movable surface, a current movable surface, and a treble movable surface;
each said bass movable surface, said current movable surface, and said treble movable surface having:

a LinRest value associated with a movable surface rest position photodetector response;

a LinDown value associated with a movable surface down position photodetector response;

a TrebErr value associated with the crosstalk contribution of a first adjacent movable surface to a current movable surface;

a BassErr value associated with the crosstalk contribution of a second adjacent movable surface to a current movable surface;

where an estimate of position for one key of said movable surfaces may be made by identifying one of said subgroups where said key is a current movable surface, and thereafter measuring a photodetector response from said current movable surface using said current movable surface LinRest value and said current movable surface LinDown value, and thereafter subtracting a Treble Crosstalk Error value derived from said TrebErr value and said movable surface photodetector responses and also subtracting a Bass Crosstalk Error value derived from said BassErr value and said movable surface photodetector responses.

18. The method of claim 17 where each said photodetector is associated with a co-sighted optical source which is disabled for a duration to measure an ambient light photodetector response LightOff, and enabled for a duration to measure a reflected light plus ambient photodetector response LightOn, thereafter performing a subtraction of said Lightoff from said LightOn to generate a reflected light value.

19. The method of claim 17 where each said photodetector is associated with a co-sighted optical source, and each said optical source and associated photodetector is enabled during an exclusive interval of time from adjacent optical sources or photodetectors.

20. The method of claim 17 where said Bass Crosstalk Error is computed by multiplying said BassErr value by the difference between a bass movable surface photodetector response and a current movable surface photodetector response and said Treble Crosstalk Error is computed by multiplying said TrebErr value by the difference between a treble movable surface photodetector response and a current movable surface response.

* * * * *